United States Patent [19]

Tsurumaki et al.

[11] Patent Number: 5,167,975
[45] Date of Patent: Dec. 1, 1992

[54] FROZEN CREAM PUFF PASTE

[75] Inventors: Chihiro Tsurumaki; Shinobu Sugiyama, both of Tokyo, Japan

[73] Assignee: Asahi Denka Kogyo Kabushiki Kaisha, Tokyo, Japan

[21] Appl. No.: 543,582

[22] Filed: Jun. 26, 1990

[30] Foreign Application Priority Data

Jul. 4, 1989 [JP] Japan .................................. 1-171274

[51] Int. Cl.$^5$ ............................................. A21D 10/02
[52] U.S. Cl. ...................................................... 426/128
[58] Field of Search .................. 426/94, 128, 556, 153, 426/578, 524, 558

[56] References Cited

U.S. PATENT DOCUMENTS

| | | | |
|---|---|---|---|
| 2,733,238 | 9/1958 | Kerr et al. | 426/578 |
| 2,935,510 | 5/1960 | Wurzburg | 426/578 |
| 3,022,289 | 2/1962 | Tuschhoff et al. | 426/578 |
| 3,615,684 | 10/1971 | Workin | 426/556 |
| 3,655,402 | 4/1972 | Dougan | 426/94 |
| 4,275,082 | 6/1981 | Dougan | 426/94 |
| 4,615,888 | 10/1986 | Zallie et al. | 426/556 |
| 4,622,226 | 11/1986 | Ke et al. | 426/94 |
| 4,741,908 | 5/1988 | Brooks et al. | 426/95 |
| 4,847,104 | 7/1989 | Benjamin et al. | 426/19 |
| 4,904,493 | 2/1990 | Petrizzelli | 426/556 |
| 4,973,447 | 11/1990 | Seib et al. | 426/556 |

FOREIGN PATENT DOCUMENTS 55-77850  6/1980  Japan .
59-82036  5/1984  Japan .

OTHER PUBLICATIONS

Y. Pomeranz, Modern Cereal Science and Technology, 1987, VCH Publishers, Inc., New York, N.Y., pp. 400–407.

Primary Examiner—Jeanette Hunter
Assistant Examiner—Mary S. Mims
Attorney, Agent, or Firm—Young & Thompson

[57] ABSTRACT

A frozen cream puff paste which comprises 100 parts by weight of a retrogradation-resistant modified processed starch or wheat flour and a retrogradation-resistant modified processed starch, from 80 to 200 parts by weight of fat(s) and/or oil(s), from 100 to 200 parts by weight of water, from 100 to 250 parts by weight of whole egg and from 0.005 to 5 parts by weight of diacetyltartaric acid monoglyceride and/or succinic acid monoglyceride.

7 Claims, No Drawings

FROZEN CREAM PUFF PASTE

BACKGROUND OF THE INVENTION

1. Field of the Invention

This invention relates to a frozen cream puff paste.

2. Description of the Prior Art

The production of food products comprising a cream puff paste such as cream puff, eclair or paris-brest requires much labor. In particular, it is very difficult to produce uniform and excellent cream puff shells in the home or ordinary food service industry depending chiefly on part-time workers. Even in a confectionery shop or a bakery where skilled craftsmen are working, labor reduction has become more and more important, since the recent diversification of consumers' preference has substantially increased the number of products.

Accordingly, attempts have been made to develop a powdery mix or a frozen cream puff paste in order to facilitate the production of cream puff shells.

For example, Japanese Patent Laid-Open No. 77850/1980 and No. 82036/1984 propose each an instant powdery mix for cream puff, but these processes still require a great deal of skill for the production of a paste and the shaping of the obtained paste. On the other hand, a process which comprises preliminarily producing a paste, shaping it and then storing it in a frozen state suffers from some problems. When a cream puff paste of a common composition is frozen, retrogradation of starch, denaturation of protein and destruction of the paste tissue caused by the development of ice crystals are observed. Thus the paste would not sufficiently puff upon reheating. Japanese Patent Laid-Open No. 155041/1987 discloses the production of a frozen cream puff paste with the use of a unique baking powder. However this process is disadvantageous in that a prolonged storage (i.e., longer than three months) would reduce the volume of a baked puff shell and cause less cracking, thus lowering the commercial value of the product.

SUMMARY OF THE INVENTION

It is an object of the present invention to provide a frozen cream puff paste from which cream puff shells uniform in shape and volume can be easily produced by merely thawing and baking, even after storing for a prolonged period of time exceeding three months.

The frozen cream puff paste of the present invention is featured by comprising a processed starch and diacetyltartaric acid monoglyceride and/or succinic acid monoglyceride, and further by comprising a processed starch and diacetyltartaric acid monoglyceride and/or succinic acid monoglyceride and being shaped into a given form. Furthermore, it is featured by comprising a processed starch and diacetyltartaric acid monoglyceride and/or succinic acid monoglyceride and being filled in a package.

The effects of the present invention are as follows.

(1) Excellent cream puffs can be produced in the food service industry or the home, since excellent cream puff shells can be easily prepared by thawing and baking the frozen cream puff paste of the present invention when required.

(2) Labor can be saved in a bakery or a confectionery shop.

(3) Since the frozen cream puff paste of the present invention is frozen in the form of a paste, it saves space, compared with baked products. Further, various products may be easily prepared therefrom.

DETAILED DESCRIPTION OF THE INVENTION

The cream puff paste of the present invention may be a common one comprising wheat flour, fat(s) and/or oil(s), whole egg and water, without restriction.

As the wheat flour, one or more materials selected from among soft flour, medium flour, hard flour and protein-enriched flour may be used. As the fats and oils, one or more materials selected from among lard, butter, margarine, shortening and oils may be used. As the whole egg, one or more materials selected from among fresh eggs, fresh liquid eggs, pasteurized eggs and frozen eggs may be used.

As the processed starch to be used in the present invention, those resistant against aging are preferable. Examples thereof include those obtained by esterifying a starch originating from, for example, waxy corn, tapioca, potato or wheat flour in the presence of, for example, acetic acid, phosphoric acid or adipic acid. In the present invention, it is particularly preferable to use retrogradation-resistant processed starch obtained by diesterifying waxy corn starch or tapioca starch through a two-stage esterification process. Such a processed starch would remain gelatinized even in a frozen state by virtue of its retrogradation resistance. Thus it can puff without releasing the steam and carbon dioxide contained in the cream puff paste, when heated again.

The diacetyltartaric acid monoglyceride to be used in the present invention may be obtained by reacting diacetyltartaric anhydride with a mono- or diglyceride in the presence of acetic acid or esterifying a mono- and diglyceride with both tartaric acid and acetic acid in the presence of acetic anhydride.

The diacetyltartaric acid monoglyceride and/or succinic acid monoglyceride can strengthen the gluten protein tissue of wheat flour, prevent starch from being retrograded and, furthermore, exert an emulsifying effect to thereby inhibit the development of ice crystals in a frozen state. Thus the above-mentioned problem that the thawed paste cannot well puff because the developed ice crystals break the tissue of the paste to liberate steam and carbon dioxide upon reheating can be solved thereby.

In the present invention, the diacetyltartaric acid monoglyceride and/or succinic acid monoglyceride may be used together with other emulsifier(s). Examples of the emulsifiers include fatty acid monoglycerides, polyglycerol fatty acid esters, lecithin, sucrose fatty acid esters and condensed ricinoleic acid monoglyceride. The addition of these emulsifiers can further improve the emulsifying effect and thus elevate the effect of inhibiting the development of ice crystals.

The cream puff paste of the present invention comprises from 80 to 200 parts by weight, preferably from 100 to 150 parts by weight, of fat(s) and/or oil(s), from 100 to 200 parts by weight, preferably from 110 to 180 parts by weight, of water, from 100 to 250 parts by weight of whole egg, from 0.05 to 5 parts by weight, preferably from 0.1 to 0.6 part by weight of diacetyltartaric acid monoglyceride and/or succinic acid monoglyceride and from 0.05 to 10 parts by weight, preferably from 0.1 to 5 parts by weight, of the above-mentioned emulsifier(s) other than the diacetyltartaric acid monoglyceride and succinic acid monoglyceride, per 100 parts by weight of processed starch or wheat flour and processed starch.

The above-mentioned wheat flour and processed starch may be used at a ratio by weight of wheat flour to processed starch of from 0:100 to 90:10, preferably from 50:50 to 90:10.

In addition to these ingredients, the cream puff paste of the present invention may further comprise protein(s) such as sodium caseinate and puffing agent(s) such as ammonium bicarbonate or sodium bicarbonate. Further, it may optionally contain common additives such as colorant(s), perfume(s) and preservative(s).

The frozen cream puff paste of the present invention may be produced by a method commonly employed for the production of a frozen cream puff paste.

For example, given amounts of fat(s) and/or oil(s), emulsifier(s) and water are put into a mixer bowl and boiled therein. Then the mixture is put into a vertical mixer and thoroughly mixed with wheat flour and processed starch. After adding puffing agent(s), the mixture is further mixed well to thereby give a paste. Alternately, wheat flour, processed starch and fat(s) and/or oil(s) are mixed together under heating and then water is added thereto to thereby gelatinize the starch. Next, whole egg, emulsifier(s) and puffing agent(s) are added thereto.

Examples of the device to be used in order to produce the cream puff paste include a small-sized pot, a vertical mixer, a horizontal mixer, a batch-wise or continuous kneader and a single- or twin-screw extruder.

The paste thus produced is formed into a given shape or packed, and then freezed.

The cream puff paste may be formed into various shapes, for example, that of a dome for common cream puff, that of a stick for eclair or that of a ring for paris-brest.

When the cream puff paste is one preliminarily formed into a given shape, as in the above-mentioned case, excellent cream puff shells can be easily obtained merely by placing the shaped paste on a baking sheet and baking, which considerably saves labor.

Alternately, the produced paste may be packed in a case, for example, a plastic (polyethylene) triangular bag so that the product can be formed into various shapes through suitable contrivance. In this case, handmade products can be enjoyed in the home.

In the above-mentioned shaping or packing step, a device such as a depositor may be preferably employed so as to enable constant-rate operation.

It is preferable to conduct rapid freezing at a temperature of $-25°$ C or below so as to prevent the development of ice crystals. When a preshaped paste is to be frozen, it is desirable to glaze the paste with water or a solution of salt(s) or gelatinizing agent(s) so as to prevent the vaporization of the moisture or oxidation during the freezing. It is preferable to effect the freezing within 30 minutes and to completely freeze the paste to the core.

The frozen cream puff paste of the present invention may be thawed at a low temperature of around 5° C., at room temperature (from 10 to 25° C.) or in a proof box at 30° to 38° C. at a humidity of 70 to 85%. When the frozen cream puff paste is packed in a bag, furthermore, it may be thawed with running water or warm water (20° to 40° C.). Each thawing method can give a cream puff paste from which excellent baked products can be obtained.

Although the cream puff paste is preferably baked in an oven, it may be baked in an oven toaster in the home.

EXAMPLES

Now the present invention will be illustrated by reference to the following Examples.

EXAMPLE 1

In accordance with the composition (1) as specified in Table 1, margarine and water were fed into a vertical mixer bowl and boiled by heating. Then diacetyltartaric acid monoglyceride, wheat flour and processed starch were added thereto and the obtained mixture was gelatinized by thoroughly mixing them. The processed starch employed here was one obtained by diesterifying waxy corn starch through a two-stage esterification process (the same processed starch was employed hereinafter).

Next, whole egg was added thereto in three portions. Further, ammonium bicarbonate, sodium bicarbonate and sodium ascorbate, which had been dissolved in a small amount of whole egg, were added and the obtained mixture was well stirred to thereby give a paste.

20-g portions of part of the paste were forced into a domelike shape on a baking sheet and baked in an oven at 220° C. 20-g portions of the rest of the paste were forced into the shape of a dome on a tray and glazed with a 0.2% solution of polysodium acrylate. The shaped pastes were rapidly frozen at $-40°$ C. for 30 minutes. The frozen shaped pastes were packed in a polyethylene bag and stored at $-18°$ C. or below for six months. Thereafter the pastes were arranged on a baking sheet, thawed in a proof box at 38° C. at a humidity of 85% for 10 minutes and baked in an oven at 220° C. for 20 minutes.

Separately, the composition (2) was treated in the same manner to conduct a blank test wherein neither the processed starch nor diacetyltartaric acid monoglyceride was employed Table 2 summarizes the results of the comparison of the obtained products The products produced from the frozen cream puff paste of the present invention were comparable to those produced by baking the paste immediately after the preparation, from the viewpoints of volume and cracking on the upper surface, even after storing for six months. In contrast thereto, the products produced from the frozen paste of the common composition did not puff when baked, which completely damaged the commercial value thereof.

EXAMPLE 2

Two continuous kneaders were employed. In accordance with the composition (3) as specified in Table 1, thoroughly mixed wheat flour and processed starch were fed through the inlet of the first continuous kneader and extruded while heating and mixing. Next, molten and mixed lard, succinic acid monoglyceride and a fatty acid monoglyceride were added thereto. Water was further added to the mixture under heating and the gelatinized slurry thus obtained was fed into the second continuous kneader.

While cooling the slurry in the second kneader, whole egg and ammonium carbonate were added thereto. The obtained mixture was extruded and packed in triangular polyethylene bags in 500-g portions.

30-g portions of part of the paste were immediately arranged each in the shape of a ring on a baking sheet and baked in an oven at 220° C. The rest of the cream puff paste was rapidly frozen at −40° C. for 50 minutes and stored at −18° C. for six months.

The frozen paste was thawed in running water for one hour, and 30-g portions thereof were arranged each in the shape of a dome on a baking sheet, glazed with water and baked in an oven at 220° C. for 25 minutes.

Separately, the composition (4) as specified in Table 1 was treated in the same manner to conduct a blank test wherein neither the processed starch, succinic acid monoglyceride nor fatty acid monoglyceride was employed.

Table 2 summarizes the results of the comparison of the obtained products. The products produced from the frozen cream puff paste of the present invention were comparable to those produced by baking the paste immediately after the preparation, from the viewpoints of volume and cracking on the upper surface, even after storing for six months. In contrast thereto, the products produced from the frozen paste of the common composition did not puff when baked.

EXAMPLE 3

In accordance with the composition (5) as specified in Table 1, margarine was molten in a vertical mixer bowl. Then wheat flour, diacetyltartaric acid monoglyceride, succinic acid monoglyceride and diesterified retrogradation-resistant processed starch were added thereto and homogeneously stirred. Next, boiling water was added thereto and the mixture was thoroughly mixed to thereby gelatinize the starch.

Next, whole egg was added thereto in three portions. Further, ammonium bicarbonate and sodium bicarbonate, each dissolved in a small amount of whole egg, were added thereto and the obtained mixture was well stirred to thereby give a paste.

20-g portions of part of the paste were force into the shape of a dome on a baking sheet and baked in an oven at 220° C. 20-g portions of the rest of the paste were forced into the shape of a dome on a tray, glazed with water, and rapidly frozen at −40° C. for 30 minutes.

The frozen shaped pastes were packed in a polyethylene bag, stored at −18° C. or below for six months, arranged on a baking sheet, thawed at room temperature (20° C.) for 60 minutes, and then baked in an oven at 220° C. for 20 minutes.

Separately, the composition (6) was treated in the same manner to conduct a blank test wherein neither the processed starch, diacetyltartaric acid monoglyceride nor succinic acid monoglyceride was employed.

Table 2 summarizes the results of the comparison of the obtained products. The products produced from the frozen cream puff paste of the present invention were comparable to those produced by baking the paste immediately after the preparation, from the viewpoints of volume and cracking on the upper surface, even after storing for six months. In contrast thereto, the products produced from the frozen paste of the common composition did not puff when baked which completely damaged the commercial value thereof.

EXAMPLE 4

In accordance with the composition (7) as specified in Table 1, margarine and water were fed into a vertical mixer bowl and boiled therein by heating. Then wheat flour, processed starch, diacetyltartaric acid monoglyceride and a polyglycerol fatty acid ester were added thereto and mixed well to cause gelatinization.

Next, whole egg was added thereto in three portions. Further, ammonium bicarbonate and sodium bicarbonate, each dissolved in a small amount of whole egg, were added thereto and the obtained mixture was well stirred to thereby give a paste.

25-g portions of part of the paste were forced into the shape of a stick on a baking sheet and baked in an oven at 200° C. 25-g portions of the rest of the paste were forced into the shape of a stick on a tray and glazed with a 0.1% solution of carrageenan. Then it was rapidly frozen at −40° C. for 30 minutes.

The frozen shaped cream puff pastes were packed in a polyethylene bag and stored at −18° C. or below for six months. Thereafter the pastes were arranged on a baking sheet to be thawed at 30° C. for 20 minutes and then baked in an oven at 200° C. for 25 minutes.

Separately, the composition (8) was treated in the same manner to conduct a blank test wherein neither the processed starch, diacetyltartaric acid monoglyceride nor polyglycerol fatty acid ester was employed.

Table 2 summarizes the results of the comparison of the obtained products. The products produced from the frozen cream puff paste of the present invention were comparable to those produced by baking the paste immediately after the preparation, from the viewpoints of volume and cracking on the upper surface, even after storing for six months. In contrast thereto, the products produced from the frozen paste of the common composition did not puff when baked.

EXAMPLE 5

In accordance with the composition (9) as specified in Table 1, margarine and water were fed into a vertical mixer bowl and boiled by heating. Then wheat flour, retrogradation-resistant processed starch, diacetyltartaric acid monoglyceride, succinic acid monoglyceride, a fatty acid monoglyceride and a polyglycerol fatty acid monoglyceride were added thereto and mixed well to cause gelatinization.

Next, whole egg was added thereto in three portions. Further, ammonium bicarbonate dissolved in a small amount of whole egg was added thereto and the obtained mixture was well stirred to thereby give a paste.

20-g portions of part of the paste were forced into the shape of a dome on a baking sheet and baked in an oven at 220° C. 20-g portions of the rest of the paste were forced into the shape of a dome on a tray, glazed with water, and rapidly frozen at −40° C. for 30 minutes.

The frozen shaped pastes were packed in a polyethylene bag and stored at −18° C. or below for six months. Thereafter the pastes were arranged on a baking sheet, thawed in a proof box at 38° C. at a humidity of 80% for 20 minutes, and then baked in an oven at 220° C. for 25 minutes.

Separately, the composition (10) was treated in the same manner to conduct a blank test.

Table 2 summarizes the results of the comparison of the obtained products. The products produced from the frozen cream puff paste of the present invention were comparable to those produced by baking the paste immediately after the preparation, even after storing for six months. In contrast thereto, the products produced from the frozen paste of the common composition did not puff when baked, which completely damaged the commercial value thereof.

TABLE 1

| | Composition No. | | | | | | | | | (part by weight) |
|---|---|---|---|---|---|---|---|---|---|---|
| | (1) | (2) | (3) | (4) | (5) | (6) | (7) | (8) | (9) | (10) |
| soft wheat flour | 20 | 50 | | 50 | 40 | 60 | 40 | 50 | | 40 |
| hard wheat flour | 50 | 50 | 50 | 50 | 40 | 40 | 50 | 50 | 60 | 60 |
| processed starch | 30 | | 50 | | 20 | | 10 | | 40 | |
| diacetyltartaric acid monoglyceride | 0.5 | | | | 0.4 | | 0.3 | | 0.3 | |
| succinic acid monoglyceride | | | 0.3 | | 0.4 | | | | 0.2 | |
| fatty acid monoglyceride | | | | 0.2 | | | | | 0.1 | |
| polyglycerol fatty acid ester | | | | | | | 0.2 | | 0.1 | |
| margarine | 100 | 100 | | | 150 | 150 | 120 | 120 | 130 | 130 |
| lard | | | 80 | 80 | | | | | | |
| water | 140 | 140 | 150 | 150 | 150 | 150 | 130 | 130 | 160 | 160 |
| whole egg | 230 | 230 | 200 | 200 | 220 | 220 | 240 | 240 | 200 | 200 |
| sodium ascorbate | 0.0001 | 0.0001 | | | | | | | | |
| ammonium bicarbonate | 0.5 | 0.5 | 1.0 | 1.0 | 0.6 | 0.6 | 0.5 | 0.5 | 0.1 | 0.1 |
| sodium bicarbonate | 0.5 | 0.5 | | | 0.4 | 0.4 | 0.5 | 0.5 | | |

TABLE 2

| | | Composition No. | | | | | | | | | |
|---|---|---|---|---|---|---|---|---|---|---|---|
| | | (1) | (2) | (3) | (4) | (5) | (6) | (7) | (8) | (9) | (10) |
| A | volume | 210 | 216 | 208 | 200 | 207 | 211 | 221 | 218 | 205 | 208 |
| | cracking | ○ | ○ | ○ | ○ | ○ | ○ | ○~△ | ○~△ | ○ | ○ |
| B | volume | 213 | 85 | 200 | 92 | 195 | 78 | 220 | 98 | 207 | 81 |
| | cracking | ○ | X | ○~△ | X | ○ | X | ○~△ | X | ○ | X |

Note
A: evaluated immediately after the production.
B: evaluated after storing in a frozen state for six months.
volume: ml per shell.
cracking:
○: remarkable and excellent cracking
△: less cracking.
X: no cracking.

What is claimed is:

1. A frozen cream puff paste which comprises 100 parts by weight of a retrogradation-resistant modified processed starch or wheat flour and a retrogradation-resistant modified processed starch, from 80 to 200 parts by weight of fat(s) and/or oil(s), from 100 to 200 parts by weight of water, from 100 to 250 parts by weight of whole egg and from 0.005 to 5 parts by weight of diacetyltartaric acid monoglyceride and/or succinic acid monoglyceride.

2. A frozen cream puff paste as claimed in claim 1, wherein said wheat flour and said starch are used at a ratio by weight of wheat flour to starch of from 50:50 to 90:10.

3. A frozen cream puff paste as claimed in claim 1, further comprising from 0.05 to 10 parts by weight of one or more emulsifiers selected from the group consisting of fatty acid monoglycerides, polyglycerol fatty acid esters, lecithin, sucrose fatty acid esters and condensed ricinoleic acid monoglyceride.

4. A frozen cream puff paste as claimed in claim 1, having the shape of a dome for cream puff, that of a stick for eclair or that of a ring for paris-brest.

5. A frozen cream puff paste as claimed in claim 1, which is packed in a plastic package.

6. A frozen cream puff paste as claimed in claim 1, wherein said retrogradation-resistant modified processed starch is produced by esterifying a starch originating from waxy corn, tapioca, potato or wheat flour in the presence of acetic acid phosphoric acid or adipic acid.

7. A frozen cream puff paste as claimed in claim 1, wherein said retrogradation-resistant modified processed starch is produced by diesterifying waxy corn starch or tapioca starch through a two-stage esterification process.

* * * * *